United States Patent [19]

Grape et al.

[11] Patent Number: 4,831,169

[45] Date of Patent: May 16, 1989

[54] ORGANOPOLYSILOXANE OILS

[75] Inventors: Wolfgang Grape; Ottfried Schlak, both of Cologne; Rolf M. Braun, Krefeld, all of Fed. Rep. of Germany

[73] Assignee: Bayer Aktiengesellschaft, Leverkusen, Fed. Rep. of Germany

[21] Appl. No.: 87,054

[22] Filed: Aug. 18, 1987

[30] Foreign Application Priority Data

Aug. 21, 1986 [DE] Fed. Rep. of Germany ....... 3628319

[51] Int. Cl.$^4$ .............................................. C07F 7/08
[52] U.S. Cl. .................................................. 556/451
[58] Field of Search ......................................... 556/451

[56] References Cited

U.S. PATENT DOCUMENTS

| 3,450,736 | 6/1969 | DeMonterey et al. | 556/451 X |
| 3,616,836 | 11/1971 | Alsgaard | 556/451 X |
| 4,011,247 | 3/1977 | Sato et al. | 556/451 X |
| 4,113,760 | 9/1978 | Frey et al. | 556/451 X |
| 4,443,351 | 4/1984 | Keil | 556/451 X |
| 4,520,160 | 5/1985 | Brown | 556/451 X |

FOREIGN PATENT DOCUMENTS 630911 10/1949 United Kingdom ........... 556/451 X

*Primary Examiner*—Paul F. Shaver

*Attorney, Agent, or Firm*—Sprung Horn Kramer & Woods

[57] ABSTRACT

An organopolysiloxane of the formula

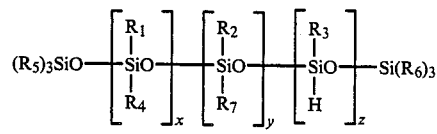

in which
 $x = 0$ to 500,
 $y = 5$ to 500,
 $z = 5$ to 500,
 $R_1$, $R_2$, $R_3$, $R_4$, $R_5$ and $R_6$ independently of one another, represent a saturated and/or unsaturated, optionally also branched alkyl radical having 1 to 4 C atoms, and/or an aryl radical having 6 to 9 C atoms, which may also be optionally alkyl-substituted,
 $R_7$ represents an alkyl radical having 6 to 18 C atoms, and in which in each case at least 3% of the radicals bonded to Si are $R_7$ and H. They are reactive with substrates and thus wash-resistant.

6 Claims, No Drawings

ORGANOPOLYSILOXANE OILS

The present invention relates to new organopolysiloxanes of the general formula

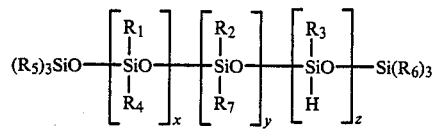

in which
x = 0 to 500,
y = 5 to 500,
z = 5 to 500,
$R_1$, $R_2$, $R_3$, $R_4$, $R_5$ and $R_6$, independently of one another, represent a saturated and/or unsaturated, optionally also branched alkyl radical having 1 to 4 C atoms, and/or an aryl radical, having 6 to 9 C atoms, which may also be optionally alkyl-substituted,
$R_7$ represents an alkyl radical having 6 to 18 C atoms and
in which at least 3% of the radicals in each case bonded to Si are $R_7$ and H.

The invention furthermore relates to the use of such organopolysiloxanes (also called silicone oils below) for the impregnation or coating of textiles, glass fibers, plaster and inorganic oxidic materials (for example masonry).

The invention furthermore relates to the use of the silicone oils according to the invention for modifying organic binding agents and plastics, such as polyethylene, polypropylene, polyester, polyurethane, polycarbonate etc.

Polydimethylsiloxanes of the general formula

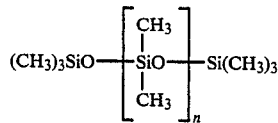

can be employed, inter alia, for rendering various surfaces hydrophobic (cf. Noll, Chemie and Technologie der Silicone [Chemistry and Technology of the Silicones]; 2nd Edition 1968, pp. 386 ff).

However, it becomes noticeable as a disadvantage, for example when rendering textiles hydrophobic, that fixing to the textile does not occur in the case of such silicone oils. Textile finishes having pure polydimethylsiloxanes are therefore not machine washable.

It has therefore been proposed that silicone oils be used which contain SiH units which are capable of reacting with the textile surface, i.e. either silicone oils of the general formula

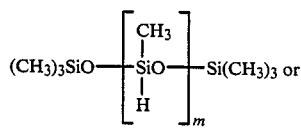

silicone oils of the general formula

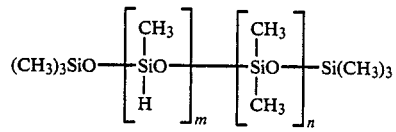

(cf. M. Seidel, H. Kiesling, Textilveredlung [Textile Finishing] 20 (1985), p. 8).

What has been stated for textile surfaces applies analogously to the surfaces of inorganic pigments, for example $TiO_2$ pigments or other oxides having surface-bonded OH radicals.

Silicone oils having long-chain alkyl radicals on silicon are likewise known, for example from DE-A No. 3,436,164.

Silicone oils of the general formula

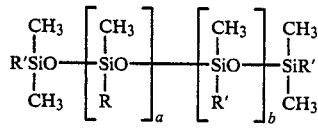

in which
R represents a straight-chain alkyl radical having 6 to 18 C atoms or a branched alkyl radical having 6 to 16 C atoms,
R' denotes straight-chain or branched alkyl radicals having 1 to 7 C atoms or the phenyl radical, and
a and b denote integers from 1 to 500, the b:a ratio being greater than 2;
having a pour point (according to DIN No. 51 583) below −15° C. are described there.

These silicone oils serve as base fluids for lubricant oil preparations, since the conventional additives in these oils are clearly soluble in adequate amounts, but are also miscible with mineral oils of various origin.

Silicone oils which contain both SiH groups, and thus permit, for example, adhesion to surfaces to be rendered hydrophobic, and also longer alkyl radicals, and thus improve, for example, the miscibility with organic materials, are not described in the literature.

Surprisingly, it has now been found that a synergistic effect is produced in many applications from the simultaneous presence of SiH and relatively long alkyl groups in the molecule of silicone oil.

The object of the present invention was therefore to make available silicone oils which contain both SiH groups and also relatively long alkyl groups in one molecule.

The present invention thus relates to silicone oils of the general formula

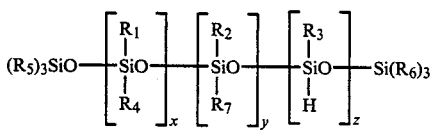

in which
x = 0 to 500
y = 5 to 500
z = 5 to 500
$R_1$, $R_2$, $R_3$, $R_4$, $R_5$ and $R_6$, independently of one another, represent a saturated and/or unsaturated, optionally also branched alkyl radical having 1 to 4 C atoms, and/or an aryl radical, having 6 to 9 C atoms, which may also be optionally alkyl-substituted, $R_7$ represents an alkyl radical having 6 to 18 C atoms, and in which in each case at least 3% of the radicals bonded to Si are $R_7$ and H.

In the terminal groups, the radicals $R_5$ and $R_6$ may in each case also represent different substituents, which means that different substituents may also be bonded to one terminal silicon atom.

The radicals $R_1$, $R_2$, $R_3$, $R_4$, $R_5$ and $R_6$ preferably represent a methyl group.

Examples of straight-chain radicals $R_7$ are hexyl, octyl, nonyl, decyl, dodecyl and tetradecyl radicals. However $R_7$ may also be a branched alkyl radical. Examples of branched alkyl radicals are 3-methylpentyl, 2,3-dimethylbutyl, 3-butylhexyl and 4-propyloctyl radicals. The oils here may in each case contain identical or also different radicals R. Particularly preferred alkyl radicals R are the dodecyl and the tetradecyl radical, in particular also mixtures of the two.

x, y and z are preferably selected so that
x=5 to 50,
y=5 to 50, and
z=5 to 500.
Silicone oils having
x=0,
y=5 to 25, and
z=5 to 25,
are likewise preferred.

The organopolysiloxanes according to the invention can be prepared, for example, by initially preparing an oil of the general formula

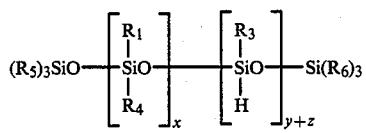

and then, in a second step, carrying out a Pt-catalyzed addition of y mols of α-olefin per mol of silicone oil.

However, it is also possible to prepare the silicone oils according to the invention directly from the corresponding chlorosilanes by hydrolysis and separation off of the resultant acid. In addition, it is likewise possible to subject two silicone oils which in each case contain SiH and $SiR_7$ groups to an acidic equilibration reaction in order to prepare the silicone oils according to the invention.

The silicone oils according to the invention may furthermore have small amounts of branches and/or contain small amounts of phenylsiloxanes without this significantly impairing the properties.

Furthermore, the oils according to the invention may also contain terminal OR' groups (where R'=methyl, ethyl or propyl); in contrast, the content of SiOH groups should be as low as possible in order that the shelf life is not impaired by reaction with the SiH groups.

The Pt catalysts used are well known; these can be platinum or platinum compounds; fixed to support material, dispersed or dissolved. Those catalyst solutions are preferably employed as are described, for example, in U.S. Pat. No. 2,823,218.

The execution of the reaction for the addition of α-olefins to SiH bonds is known per se and is described, for example, in W. Noll, Chemie und Technologie der Silicone [Chemistry and Technology of the Silicones], 2nd Edition, 1968, p. 45.

The addition reaction is specifically carried out in a fashion such that at least 3% of all radicals bonded to silicon in the final product are hydrogen radicals. It is particularly preferable that at least 10% of all radicals bonded to silicon are hydrogen radicals. It is furthermore particularly preferable that x is 0.

The silicone oils according to the invention are preferably used anywhere where the properties of the SiH groups and the $SiR_7$ group, combined in one molecule, apply simultaneously.

A typical example is the use of the oils according to the invention for the modification of pigments; during this, the SiH group fixes the molecule by reacting on the pigment surface, cleaving off hydrogen, and the $SiR_7$ group simultaneously and permanently causes improved compatibility to organic materials and a reduction of dust.

Another typical example is the impregnation of mineral masonry having high alkalinity; here the SiH group, by reaction, causes fixing in the masonry and the $SiR_7$ group causes markedly improved alkali resistance of the impregnation.

In both examples, blends of an SiH group-containing silicone oil and an $SiR_7$ group-containing silicone oil lead only to an unsatisfactory result.

If, for reasons of distribution, the silicone oils according to the invention cannot be used in concentrated form, it is entirely possible to prepare aqueous emulsions or solutions in organic solvents.

The preparation of the oils according to the invention is described below with reference to two typical examples; in these, all references to parts and percentages relate to the weight, unless otherwise stated. Example 3 additionally shows the emulsification of the silicone oil from Example 1.

EXAMPLE 1

197 parts of a methyl hydrogen polysiloxane, having terminal trimethylsilyl groups, of viscosity 15 mm²/s are placed in a reaction vessel, and 10 ppm of Pt (calculated as the metal and in the form of a solution of hexachloroplatinic acid in isopropanol) are added to this.

The vessel is warmed to 120° C. A mixture of 109 parts of α-dodecene and 69 parts of α-tetradecene are run in at this temperature over four hours. After stirring for a further 6 hours at 130° C., the mixture is cooled and discharged.

An oil, having a viscosity of 140 mm²/s, in which about ⅓ of the SiH groups originally present have been converted into SiR groups, results. The oil has the composition.

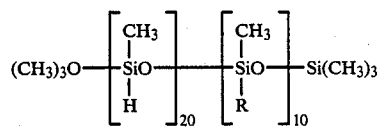

where R is a $C_{12}H_{25}/C_{14}H_{29}$ mixture.

EXAMPLE 2

232 parts of the same methyl hydrogen polysiloxane as in Example 1 are placed in a reaction vessel, and 87 parts of octamethylcyclotetrasiloxane and 5,000 ppm of perfluorobutanesulphonic acid (relative to the batch)

are added. After stirring for 7 hours at 50° C., the mixture is neutralized using zinc oxide, heated to a temperature of 130° C. at 30–40 mbar, cooled and filtered, 271 parts of a silicone oil of the formula

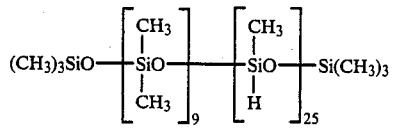

result.

This oil is allowed to react as in Example 1 with 109 parts of α-dodecene and 69 parts of α-tetradecene. An oil of the formula

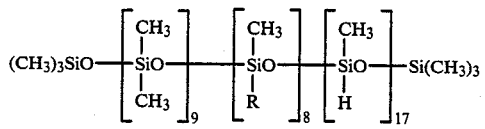

results.

EXAMPLE 3

Emulsification of the silicone oil from Example 1

513 g of water are placed in a 1-liter beaker and stirred at 25 rpm using a paddle stirrer. 14.6 g of a nonionic emulsifier (polyoxyethylenetriglyceride having an HLB of 18.1) are introduced. When this first emulsifier has dissolved homogeneously, 12.4 g of a second emulsifier are added (polyoxyethylene (6) tridecyl alcohol having an HLB of 11.4).

The silicone oil, according to the invention, from Example 1 is subsequently metered in within 1 hour. The mixture is then stirred for a further 30 minutes and homogenized 9 times at 200 bar by means of a high-pressure emulsification machine.

The emulsion is adjusted to pH 3 using a few drops of HCl.

This emulsion can be bushed over cement masonry to impart alkali resistance.

It will be appreciated that the instant specification and claims are set forth by way of illustration and not limitation, and that various modifications and changes may be made without departing from the spirit and scope of the present invention.

What is claimed is:

1. An organopolysiloxane of the formula

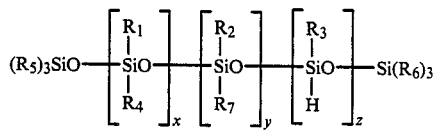

in which
x = 0 to 500,
y = 5 to 500,
z = 5 to 500,
$R_1$, $R_2$, $R_3$, $R_4$, $R_5$ and $R_6$ independently of one another, represent a saturated and/or unsaturated, optionally also branched alkyl radical having 1 to 4 C atoms, and/or an aryl radical having 6 to 9 C atoms, which may also be optionally alkyl-substituted,
$R_7$ represents a branched alkyl radical having 6 to 18 C atoms,
and in which in each case at least 3% of the radicals bonded to Si are each $R_7$ and H.

2. An organopolysiloxane according to claim 1, wherein $R_1$, $R_2$, $R_3$, $R_4$, $R_5$ and $R_6$ are methyl.

3. An organopolysiloxane according to claim 1, wherein $R_7$ is 3-methylpentyl, 2,3-dimethylbutyl, 3-butylhexyl, or 4-propyloctyl.

4. An organopolysiloxane according to claim 1, in which
x is 5 to 50,
y is 5 to 50, and
z is 5 to 50.

5. An organopolysiloxane according to claim 1, in which
x is 0,
y is 5 to 25, and
z is 5 to 25.

6. An organopolysiloxane according to claim 5, wherein $R_1$, $R_2$, $R_3$, $R_4$, $R_5$ and $R_6$ are methyl, $R_7$ is 3-methylpentyl, 2,3-dimethylbutyl, 3-butylhexyl or 4-propyloctyl and at least 10% of all radicals bonded to silicon are H.

* * * * *

UNITED STATES PATENT AND TRADEMARK OFFICE
CERTIFICATE OF CORRECTION

PATENT NO. : 4,831,169
DATED : May 16, 1989
INVENTOR(S) : Grape et al

It is certified that error appears in the above-identified patent and that said Letters Patent is hereby corrected as shown below:

Col. 3, line 25          Delete "500" and substitute --50--

Signed and Sealed this

Twenty-fourth Day of July, 1990

Attest:

HARRY F. MANBECK, JR.

Attesting Officer      Commissioner of Patents and Trademarks